United States Patent [19]

Kadota

[11] Patent Number: 4,966,214
[45] Date of Patent: Oct. 30, 1990

[54] HIGH INNER PRESSURE HEAVY DUTY PHENUMATIC RADIAL TIRE INCLUDING FOLDED BELT LAYERS

[75] Inventor: Kuninobu Kadota, Kodaira, Japan

[73] Assignee: Bridgestone Corporation, Tokyo, Japan

[21] Appl. No.: 317,499

[22] Filed: Mar. 1, 1989

[30] Foreign Application Priority Data

Mar. 1, 1988 [JP] Japan ................................. 63-45734

[51] Int. Cl.⁵ .............................................. B60C 9/26
[52] U.S. Cl. .................................... 152/528; 152/535; 152/538
[58] Field of Search ............... 152/529, 528, 536, 535, 152/538

[56] References Cited

U.S. PATENT DOCUMENTS

| 3,018,814 | 1/1962 | Saint-Paul | 152/528 X |
| 3,881,538 | 5/1975 | Mirtain | 152/529 X |
| 4,184,529 | 1/1980 | Boileai | |
| 4,258,774 | 3/1981 | Mirtain et al. | |
| 4,402,356 | 9/1986 | Musy | |

FOREIGN PATENT DOCUMENTS

| 53-119502 | 10/1978 | Japan | 152/532 |
| 60-135307 | 7/1985 | Japan | 152/538 |
| 1067991 | 5/1967 | United Kingdom | |
| 1417433 | 10/1975 | United Kingdom | |
| 1477210 | 6/1977 | United Kingdom | |

Primary Examiner—Michael W. Ball
Assistant Examiner—Geoffrey L. Knable
Attorney, Agent, or Firm—Sughrue, Mion, Zinn, Macpeak & Seas

[57] ABSTRACT

A high inner pressure heavy duty pneumatic radial tire includes a carcass of a plurality of plies made of laminated organic fiber cord layers of which one ply is turned up about bead cores, and a belt made of a plurality of laminated cord reinforcing layers. The belt includes at least one set of packing structural reinforcing layers. Each of the packing structrure reinforcing layers includes cord reinforcing layers wider than a width of the arranged belt and having width edges folded inwardly to form folded layers and further cord reinforcing layers having widths as cut corresponding to inner widths of the folded layers and surrounded by the folded layers to form inner core reinforcing layers. The further core reinforcing layers are higher in circumferential rigidity than the first mentioned core reinforcing layers. Cords of the first mentioned cord reinforcing layers and the further core reinforcing layers are made of material substantially the same at least in modulus of elasticity.

10 Claims, 4 Drawing Sheets

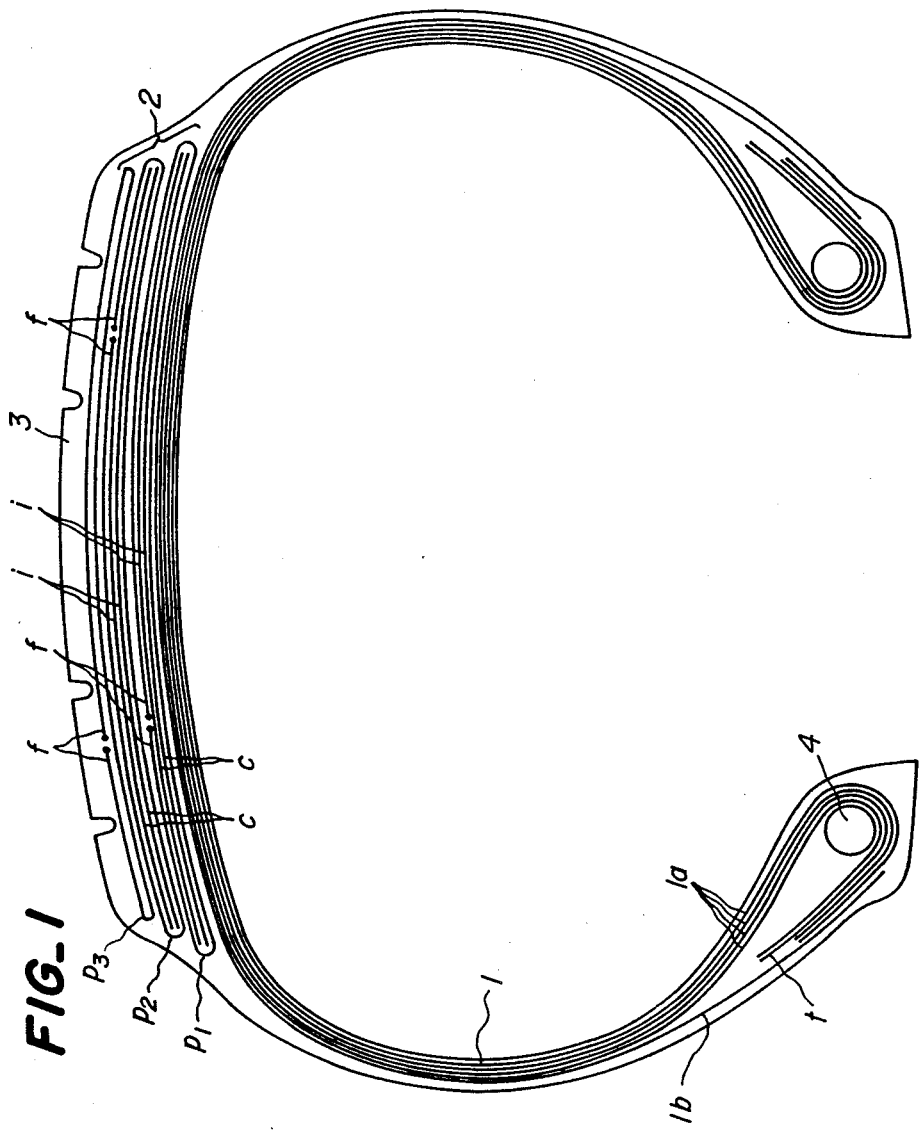

FIG_2a
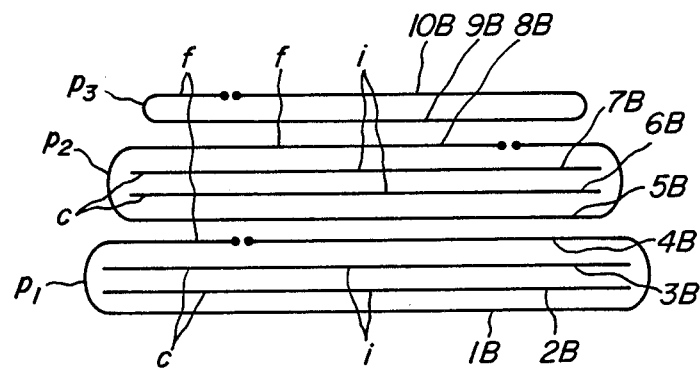
FIG_2b
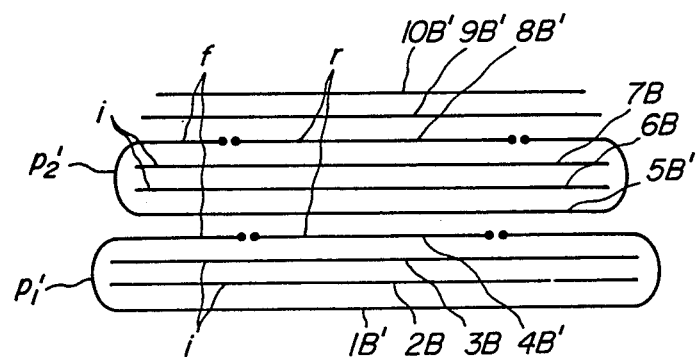

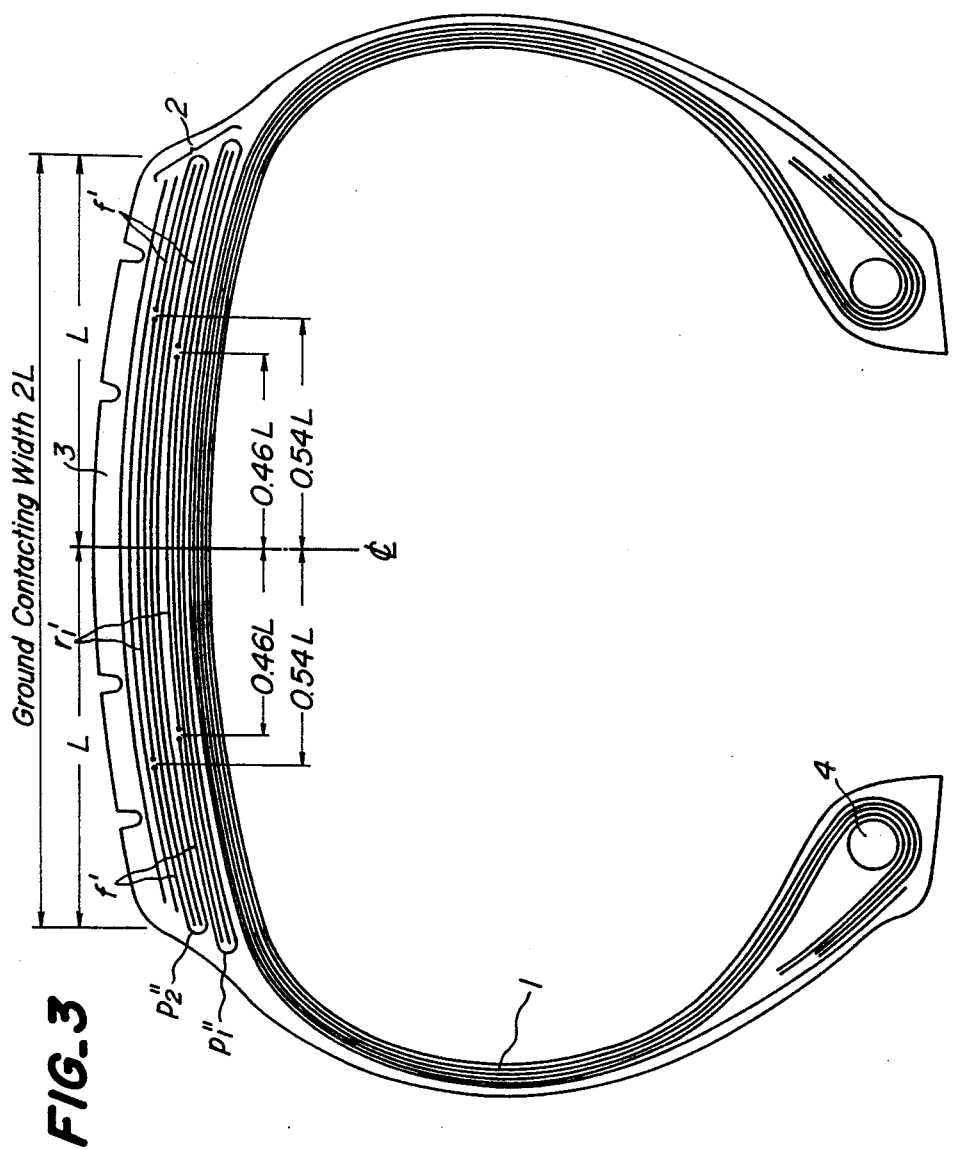

HIGH INNER PRESSURE HEAVY DUTY PHENUMATIC RADIAL TIRE INCLUDING FOLDED BELT LAYERS

BACKGROUND OF THE INVENTION

This invention relates to a high inner pressure and heavy duty pneumatic radial tire having an improved belt construction for effectively improving durability of the tire to be typically used for aircraft and the like.

With pneumatic radial tires used with high inner pressure under heavy loads, it is generally considered that belts consisting of a plurality of cord reinforcing layers are needed. In order to sufficiently support high pressure with a minimum number of belts particularly in a pressure-resistance test (which requires the ability to resist a pressure of four times a used pressure) for pneumatic radial tires of aircraft, it has been generally considered that cords of the belts should be arranged substantially in parallel with an equatorial plane. Such an arrangement of belts is often called a "circumferential belt construction". With the circumferential belt construction, however, elongation and contraction of the belts are difficult when the tire is rolling because of the particular cord arrangement. As a result, shoulder portions of a tread of the tire are dragged on a road because of outer diameters of shoulder portions being smaller than that at the center of the tread. Therefore, it is very disadvantageous for avoiding irregular wear.

Accordingly, the belt construction of cord reinforcing layers whose cords intersect with each other between the layers has been mainly used. With pneumatic radial tires such as aircraft tires used with high inner pressure under heavy loads, however, belts are subjected to great forces so that separations starting from ends of cords located at side edges of the belts are likely to occur in case of the belt construction using the intersecting cord reinforcing layers.

In order to mitigate stress concentrations causing such separations at ends of cords, it has been proposed to fold the cord reinforcing layers at the side edges of the belts. Even when using such a folding construction, the separations are not sufficiently prevented for tires such as aircraft tires which are repeatedly used by replacing worn treads plural times for a long time. Such a disadvantage results from the difference in rigidity between the folded portions, and rubber thereabout. Therefore, the durability of a tire using the folding construction is not sufficient.

SUMMARY OF THE INVENTION

It is an object of the invention to provide a pneumatic radial tire with high inner pressure subjected to heavy loads which is very superior in durability even used with high inner pressure and heavy loads and having an improved belt construction suitable for repeatedly replacing worn treads.

In order to achieve the object, in a high inner pressure heavy duty pneumatic radial tire including as reinforcing means a carcass made of a plurality of plies by laminating organic fiber cord layers in toroidal shape whose cords are arranged in parallel with each other and at cord angles within 70-90° relative to an equatorial plane of the tire, at least one of said plies having turn-up portions which are turned up about a pair of bead cores from inside to outside, and a belt made of a plurality of cord reinforcing layers whose cords are arranged in parallel with each other and at cord angles within 10-70° relative to the equatorial plane, said cord reinforcing layers being laminated with the cords intersecting between the cord reinforcing layers, according to the invention said belt comprises at least one set of packing structural reinforcing layers, each of said packing structural reinforcing layers comprising at least one cord reinforcing layer wider than a width of the arranged belt and having width edges folded inwardly to form folded layers and at least one further cord reinforcing layers having widths as cut corresponding to inner widths of the folded layers and surrounded by the folded layers to form inner core reinforcing layers, said inner core reinforcing layers being higher in circumferential rigidity than the folded layers, and cords of said folded layers and said inner core reinforcing layers being made of materials substantially the same at least in modulus of elasticity.

In another aspect of the invention, said belt comprises at least one set of packing structural reinforcing layers, each of said packing structural reinforcing layers comprising at least one cord reinforcing layer wider than a width of the arranged belt and having width edges folded inwardly to form folded layers and an intermediate layer made of at least one cord reinforcing layer is interposed between inner ends of the folded portions, and said cord reinforcing layers of the intermediate reinforcing layers are higher in circumferential rigidity than the cord reinforcing layers of the folded layers, and cords of the intermediate reinforcing layers and the folded layers are made of materials substantially the same at least in modulus of elasticity.

In a preferred embodiment, lengths of folded portions of said folded layers are substantially equal and intermediate layers made of cord reinforcing layers are interposed between inner ends of the folded portions, respectively, and the inner ends of the folded portions are spaced from the equatorial plane by substantially 35-75% of one half of a ground contacting width of a tread of the tire.

In another embodiment, a circumferential rigidity of the cord reinforcing layers of the inner core reinforcing layers is between those of said folded reinforcing layers and said intermediate reinforcing layers, and cords of the folded layers, the intermediate reinforcing layers and the inner core reinforcing layers are made of materials substantially the same at least in modulus of elasticity.

In order that the invention may be more clearly understood, preferred embodiments will be described, by way of example, with reference to the accompanying drawings.

BRIEF DESCRIPTION OF THE DRAWINGS

FIG. 1 is a sectional view illustrating one half of a high inner pressure heavy duty pneumatic radial tire according to the invention;

FIGS. 2a and 2b are schematic views explanatory illustrating laminated constructions of belts of first and second embodiments of the invention;

FIG. 3 is a sectional view illustrating one half of a high inner pressure heavy duty pneumatic radial tire of a further embodiment of the invention;

DETAILED EXPLANATION OF PREFERRED EMBODIMENTS

Figure 4:
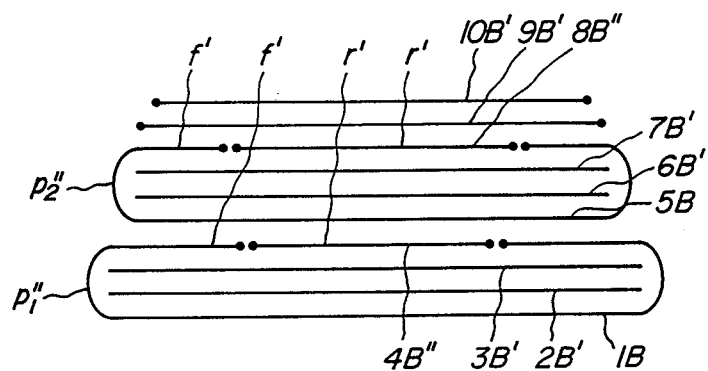
FIG. 4 is a schematic view explanatorily illustrating a laminated construction of the embodiment shown in FIG. 3.

FIG. 1 illustrates a high inner pressure heavy duty radial tire according to the invention which comprises a carcass 1, a belt 2, a tread 3 and bead cores 4.

The carcass 1 includes five plies which are shown in five solid lines, one illustrating one ply for the simplicity in FIG. 1. Among these five plies, four plies are wound or turned up about a pair of bead cores from inside to outside to form folded portions t and the remaining one ply extends along the outside of the four plies to bead heels. Such an arrangement of the carcass 1 is so-called "up-and-down construction". Each of the plies is an organic fiber cord layer in which organic fiber cords are arranged in parallel with each other at angles 70° to 90° (90° in the shown embodiment) with an equatorial plane of the tire. These plies are laminated into a toroidal shape.

The belt consists of a plurality of cord reinforcing layers (ten layers 1B–10B in this embodiment) each comprising parallel cords at angles 10-70° with the equatorial plane and surrounding the carcass at its crown portion. These cord reinforcing layers are laminated such that the cords intersect each other between the layers. Such an arrangement is in the usual manner. Organic fiber cords as nylon 66 are preferable for the material of the cords. However, it is of course that any other materials may be used for this purpose, so long as they fulfill the requirement in circumferential rigidity.

The reinforcing means above described is common to the first to fourth embodiments of this application. First, the following belt construction is essential for the first and second embodiments.

As can be seen from FIG. 1 and FIG. 2a corresponding thereto and FIG. 2b illustrating another embodiment, the belt has two sets of packing structural reinforcing layers ($p_1$, $p_2$ or $p_1'$, $p_2'$). The two sets of packing structural reinforcing layers comprise folded layers f or f' and inner core reinforcing layers c. The folded layers f or f' are formed by inwardly folding both width edges of cord reinforcing layers 1B, 5B or 1B', 5B' which have widths wider than that of the arranged belt. The inner core reinforcing layers c consist of cord reinforcing layers 2B, 3B and 6B, 7B packed in the folded layers f or f' and having widths corresponding to inner widths of the folded layers.

It is particularly important for the inner core reinforcing layers to have circumferential rigidity T higher preferably with the packing structural reinforcing layers $p_1$ or $p_2'$ than those of the folded layers f or f'.

The circumferential rigidity T is simply defined when cord angles are $\theta$ by the following equation.

T = cord strength (kg/number) × number of cords (number/cm) × $\cos^2 \theta$

As shown in FIGS. 1 and 2a, lengths of the folded portions of the folded layers f are different on both sides and jointed portions of the folded layers are alternately arranged. As shown in FIG. 2b, however, lengths of the folded portions of the folded layers may be substantially equal and intermediate layers r made of cord reinforcing layers 4B' and 8B' substantially similar to the folded layers f may be arranged between the ends of the folded portions.

Cord reinforcing layers 9B and 10B in FIGS. 1 and 2a consist of a folded layer f, on the other hand, cord reinforcing layers 9'B and 10'B are formed by two separated layers.

FIGS. 3 and 4 illustrate third and fourth embodiments, wherein carcasses 1 are substantially similar to those in the first and second embodiments and belts 2 are considerably similar to the belt in FIG. 2b so that only different features from the embodiments above described will be explained hereinafter.

In the embodiments shown in FIGS. 3 and 4, packing structural reinforcing layers $p_1''$ and $p_2''$ comprise folded layers f' and intermediate layers r'. The folded layer f' has folded portions whose inner ends directing an equatorial plane are at locations spaced from the equatorial plane by a distance corresponding to 35-75% (preferably 40-65%) of L which is one half of a ground contacting width of a tread. The intermediate layer r' connects between the inner ends of the folded portions and consists of cord reinforcing layers 4B'' or 8B'' having a circumferential rigidity higher than that of the folded layers f'.

In the third embodiment, cord reinforcing layers 2B' and 3B' or 6B' and 7B' to be surrounded by the folded layer f' may be dispensed with. Moreover, the cord reinforcing layers may be used whose circumferential rigidity is substantially equal to that of the folded layers f'.

In the fourth embodiment, inner core reinforcing layers c are arranged in addition to the arrangement above described. In this case, particularly, it is necessary to select cord reinforcing layers 4B'' and 8B'' of intermediate reinforcing layers r' such that a circumferential rigidity of the inner core reinforcing layers 2B and 3B is between those of the folded layers f' and the intermediate reinforcing layers r'.

Inventors have investigated the various manner of stress concentrations causing separations at side edges of belts in the folded construction of the prior art to find that the separations are caused by the difference in rigidity of folded portions of reinforcing layers and the rubber thereabout. The stress concentrations would be mitigated by lowering circumferential rigidity per unit width of cord reinforcing layers constituting the belts and further by making large cord angles of cord reinforcing layers used in the belts with an equatorial plane of the tire.

However, with the use of cords of lower strength, of a decrease in the number of cords and adoption of large cord angles, all these measures lower the circumferential rigidity of the belt. Therefore, the number of the reinforcing layers must be increased. As a result, heating is increased to lower the durability of the tire and to increase its weight.

In contrast herewith, when at least one set of packing structural reinforcing layers are used which consist of folded layers f and f' formed by cord reinforcing layers with inwardly folded ends and inner core reinforcing layers c enclosed in the folded layers, strain concentrations at cord ends are greatly mitigated because of ends of the cord reinforcing layers as cut being enclosed inside of the folded layers f. Therefore, different from outer cord reinforcing layers, with such cut cord reinforcing layers enclosed by folded layers, even if the circumferential rigidity is increased, the difference in strength can be eliminated which would otherwise cause separations at side edges of the belt 2.

In other words, by increasing the circumferential rigidity of the cord reinforcing layers 2B, 3B, 6B and 7B to be used in the inner core reinforcing layers i than those of the cord reinforcing layers 1B(1B') and 5B(5B') to be used in the folded layers f, the stress concentrations often occurring at folded ends of the folded layers are effectively mitigated which are likely become the cause of separations on the outside of the belt. Therefore, with such an arrangement of the cord reinforcing layers, the rigidity of the belt required for resisting pressure is ensured without increasing the number of reinforcing layers in the belt 2, and at the same time problems such as separations at the side edges of the belt 2 are prevented to improve the durability of the tire.

On the other hand, the inventors have studied in detail the deformations and behavior of belts being rolled and tested according to the pressure-resistance tests of aircraft pneumatic radial tire and found the following results.

The number of cord reinforcing layers constituting the belt 2 is of course selected to satisfy the requirements of the pressure-resistance test. The enlargement of a tire, particularly the belt caused by inner pressure is larger at a center of its width where an enlargement restricting effect by sidewalls is insufficient so that a deformation of the belt is at a maximum at the center of the width (a solid line in FIG. 5). Such maximum deformations greatly affect breakage of the belt in the pressure-resistance test. On the other hand, however, a deformation of the belt 2 at its center in rolling is a minimum as shown in a broken line in FIG. 5. The deformation becomes larger as approaching ground contacting ends of shoulders which are very different in outer diameter from those of the center of the tread.

From the above fact, it becomes possible to reduce the number of the cord reinforcing layers required for resisting pressure by increasing the circumferential rigidity because the deformations of the belt at its center being loaded in rolling are not large. In such case, the effectiveness of the intermediate reinforcing layers r' is clear.

Figure 5:
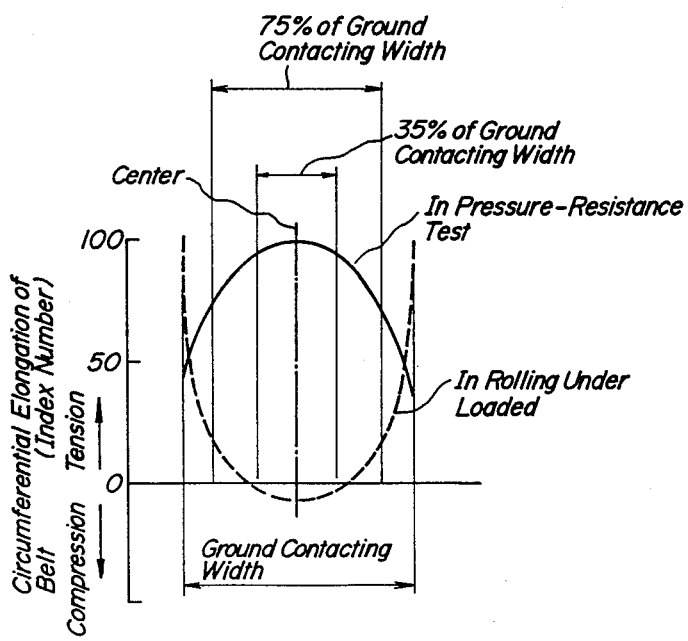
FIG. 5 is a graph illustrating a distribution of elongations of a belt in circumferential directions along width directions.

The reason why the cut ends of the cord reinforcing layers 4B'' and 8B'' used in the intermediate reinforcing layers r' must position within the area of 35-75% of a ground contacting width of the tread can be understood by referring to FIG. 5. If it is less than 35%, the contribution to the improvement of resisting to pressure becomes less. On the other hand, when it is more than 75%, separations are apt to occur because the cut ends of the cord reinforcing layers are positioned in the area where deformations under load in rolling are large.

From the viewpoint, the belts according to the third and fourth embodiments of the invention are arranged in the following manner. With at least one of the packing structural reinforcing layers $p_1''$ and $p_2''$, folded portions of the cord reinforcing layers 1B and 5B are not continuous over the entire area of the tread, and intermediate reinforcing layers consisting of cord reinforcing layers having ends as cut are arranged in a central position at substantially equal distances from a rotating axis of the tire substantially to form one layer. In this case, discontinuous points between the intermediate reinforcing layers r' and the folded layer f' are positioned within the range of 35-75% of the length from the center of ground contacting width of the tread 3 to ground contacting ends of the tread.

The circumferential rigidity of the cord reinforcing layers 4B'' and 8B'' used in the intermediate reinforcing layers r' are made larger than those of the folded layers f' to obtain rigidity which fulfills the pressure-resistance required to the belt 2 and to mitigate the stress concentrations at folded portions at the side ends of the belt 2. The result is that the durability of the tire is improved without the risk of separations.

The term "cord strength" as above used means a stress occurring in a cord when the cord is about to be broken. On the other hand, the term "modulus of elasticity of cord" is a stress occurring in a cord when the cord is elongated per unit length or a gradient in a so-called "stress-strain curve".

In case of using mixed reinforcing cords having different moduli of elasticity such as nylon, steel and aramid cords and the like for the invention, with tires used under high inner pressure such as aircraft tires, separations are apt to occur by stress concentrations at ends of belt layers including cords having high moduli of elasticity resulting from an unbalance in tensile forces supported by the respective reinforcing layers due to different in elongation of the cords.

In other words, even if the circumferential rigidity of the belt is suitably determined according to the above described, the above problem would occur so long as moduli of elasticity of the cords are different. Therefore, it is required to form the packing structure reinforcing layers by cords made of the same materials or materials having substantially same moduli of elasticity.

EXAMPLES

In FIG. 1 illustrating the first embodiment of the invention as the aircraft tire (tire size: H46×18.0 R20), the carcass 1 includes cords (1680 d/3) made of nylon 66 and arranged in parallel with each other at angles of 90° relative to the equatorial plane of the tire.

The carcass 1 is the laminated layer of the up-and-down construction comprising the four turn-up plies 1a wound about the bead cores 4 from inside to outside, and the one down ply 1b extending along the folded ends t of the turn-up plies 1a toward the bead heels.

The belt 2 in this embodiment comprises three sets of the packing structure reinforcing layers. As shown in FIG. 2a, each of the cord reinforcing layers 1B, 5B and 9B forms a folded layer 5 by folding ends with different folded lengths. Each of the folded layers 5 as indicated by cord reinforcing layers 1B or 5B surround therein the inner core reinforcing layer i consisting of the two cord reinforcing layers 2B and 3B or 6B and 7B. The belt 2 is a laminated layer consisting of ten layers formed by the three folded layers and inner core reinforcing layers in this manner.

In the embodiments shown in FIG. 2b, the folded layers f' have the folded ends of the substantially equal length and the intermediate reinforcing layers r (the cord reinforcing layers 4B' and 8B') are interposed between the folded ends of the folded layers f'. In this case, the cord reinforcing layers 9B' and 10B' are not folded at their ends which are as cut.

Table 1 shows results of tests on tires of the first and second embodiments of the invention as Examples and Comparative examples of the prior art. Cord angles in the Table 1 are those at centers of belts. Moreover, the durability of the belts in the Table 1 was indicated in the following manner. A tire filled with inner pressure of 14.1 kg/cm² and loaded with 53,040 lbs was driven at speeds increasing from 0 to 225 MPH (miles per hour) according to the standard test of FAA. Thereafter, taking-off simulations removing loads were repeated. The number of the simulations until separations at the belts occurred was indicated by an index number.

TABLE 1(a)

| | Comparative example 1 | | | Embodiment 1 | | | Comparative example 2 | | |
|---|---|---|---|---|---|---|---|---|---|
| | Cord angle | Number of cords/cm | Circumferential rigidity T kg/cm | Cord angle | Number of cords/cm | Circumferential rigidity T kg/cm | Cord angle | Number of cords/cm | Circumferential rigidity T kg/cm |
| 1B | right 20° | 7.2 | 279.7 | right 23° | 7.2 | 268.4 | right 16° | 7.2 | 292.7 |
| 2B | left 20° | 7.2 | 279.7 | left 16° | 7.2 | 292.7 | left 23° | 7.2 | 268.4 |
| 3B | right 20° | 7.2 | 279.7 | right 16° | 7.2 | 292.7 | right 23° | 7.2 | 268.4 |
| 4B | left 20° | 7.2 | 279.7 | left 23° | 7.2 | 268.4 | left 16° | 7.2 | 292.7 |
| 5B | right 20° | 7.2 | 279.7 | right 20° | 7.2 | 279.7 | right 20° | 7.2 | 279.7 |
| 6B | left 20° | 7.2 | 279.7 | left 20° | 7.2 | 279.7 | left 20° | 7.2 | 279.7 |
| 7B | right 20° | 7.2 | 279.7 | right 20° | 7.2 | 279.7 | right 20° | 7.2 | 279.7 |
| 8B | left 20° | 7.2 | 279.7 | left 20° | 7.2 | 279.7 | left 20° | 7.2 | 279.7 |
| 9B | right 20° | 7.2 | 279.7 | right 20° | 7.2 | 279.7 | right 20° | 7.2 | 279.7 |
| 10B | left 20° | 7.2 | 279.7 | left 20° | 7.2 | 279.7 | left 20° | 7.2 | 279.7 |
| Sum of T kg/cm | | 2797 | | | 2800 | | | 2800 | |
| Durability of belt (index number) | | 100 | | | 125 | | | 70 | |

| Belt cord | | Belt cord marked by * | | Belt cord marked by ** | |
|---|---|---|---|---|---|
| Material: | nylon 66 | Material: | nylon 66 | Material: | aramid (Kevlar) |
| Kind: | 1680 d/3 | Kind: | 1260 d/3 | Kind: | 1500 d/3 |
| Strength: | 44 kg/one | Strength: | 33 kg/one | Strength: | 62 kg/one |
| Initial modulus of elasticity: | 240 kg/cm$^2$ | Initial modulus of elasticity: | 240 kg/cm$^2$ | Initial modulus of elasticity: | 4000 kg/cm$^2$ |

TABLE 1(b)

| | Embodiment 2 | | | Embodiment 3 | | | Comparative example 3 | | |
|---|---|---|---|---|---|---|---|---|---|
| | Cord angle | Number of cords/cm | Circumferential rigidity T kg/cm | Cord angle | Number of cords/cm | Circumferential rigidity T kg/cm | Cord angle | Number of cords/cm | Circumferential rigidity T kg/cm |
| 1B | right 20° | 6.8 | 264.3 | right 20° | *9.2 | 268.1 | right 20° | 6.8 | 264.2 |
| 2B | left 20° | 7.6 | 295.3 | left 20° | 7.6 | 295.3 | left 20° | **5.4 | 295.6 |
| 3B | right 20° | 7.6 | 295.3 | right 20° | 7.6 | 295.3 | right 20° | **5.4 | 295.6 |
| 4B | left 20° | 6.8 | 264.2 | left 20° | *9.2 | 268.1 | left 20° | 6.8 | 264.2 |
| 5B | right 20° | 7.2 | 279.7 | right 20° | 7.2 | 279.7 | right 20° | 7.2 | 279.7 |
| 6B | left 20° | 7.2 | 279.7 | left 20° | 7.2 | 279.7 | left 20° | 7.2 | 279.7 |
| 7B | right 20° | 7.2 | 279.7 | right 20° | 7.2 | 279.7 | right 20° | 7.2 | 279.7 |
| 8B | left 20° | 7.2 | 279.7 | left 20° | 7.2 | 279.7 | left 20° | 7.2 | 279.7 |
| 9B | right 20° | 7.2 | 279.7 | right 20° | 7.2 | 279.7 | right 20° | 7.2 | 279.7 |
| 10B | left 20° | 7.2 | 279.7 | left 20° | 7.2 | 279.7 | left 20° | 7.2 | 279.7 |
| Sum of T kg/cm | | 2797 | | | 2805 | | | 2798 | |
| Durability of belt (index number) | | 128 | | | 122 | | | 68 | |

With the tires of the Examples 1-3, the circumferential rigidity T of the cord reinforcing layers 2B and 3B (inner core reinforcing layers i) was higher than that of the cord reinforcing layers 1B (folded layers f) surrounding the layers 2B and 3B. In general, the deformations of belts 2 under load become larger as the deformed portions are farther from ground contacting surfaces or are side edges of cord reinforcing layers nearer the carcass layers 1 because the ground contacting surfaces are subjected to bending deformations in circumferential directions. Therefore, it is particularly effective to apply the belt construction above described to the cord reinforcing layers positioned radially inwardly of the tire.

Moreover, with the belt constructions in the Table 1, sums of the circumferential rigidities T of all the cord reinforcing layers or rigidities of entire belts were made substantially equal to each other. Therefore, the orders of pressure resistance of the respective tires were of course substantially equal.

In Example 1, the circumferential rigidity was changed by modifying the cord angles. However, it is of course that the effects of the invention can be realized by changing the cord strengths by modifying thicknesses or the number of used cords as in Examples 2 and 3.

In Comparative example 3, cords of the cord reinforcing layers 2B and 3B of the inner core reinforcing layers were made of aramid, while nylon cords were used for the folded layers. In this case, however, although the separation-resistance at ends of the folded layers was improved, separations would occur at ends of the inner core reinforcing layers. Therefore, the improvement of durability could not be accomplished.

With the belt construction as shown in FIG. 2b in which the layers corresponding to those in FIG. 2a are shown by references added with ' (prime), substantially the same effects could be obtained.

FIG. 3 illustrates the construction of an aircraft tire (tire size H46×18.0 R20) according to the third embodiment of the invention. Cords of the carcass 1 are made of nylon 66 (1680 d/3) and arranged at angles of substantially 90° relative to the equatorial plane. The carcass is of the up-and-down construction comprising four turn-up plies wound about bead cores from the inside to the outside of the tire, and a down ply extending along the outside of the turn-up portions of the turn-up plies toward bead heels.

In this embodiment, ends of two cord reinforcing layers are folded whose folded ends are arranged at locations 46% and 54% of the length from the center of the ground contacting width and its outer end, respectively. Between the folded ends, are interposed cord reinforcing layers having cut ends as intermediate reinforcing layers r'. Moreover, two cord reinforcing layers having cut ends are arranged in the respective folded cord reinforcing layers, respectively.

Table 2 shows results of test on tires of embodiments of the invention as Examples and Comparative examples of the prior art. The durability of the belts in the Table 2 was indicated in the same manner as in the Table 1. Namely, a tire filled with inner pressure of 14.1 kg/cm$^2$ and loaded with 53,040 lbs was driven at speeds increasing from 0 to 225 MPH (miles per hour) according to the standard test of FAA. Thereafter, taking-off simulations removing loads were repeated. The number of the simulations until separations at the belts occurred was indicated by an index number.

layers was determined by the same reason as in the Table 1. Namely, the deformations of belts 2 under load become larger as the deformed portions are farther from ground contacting surfaces or are side edges of the cord reinforcing layers nearer the carcass 1 because the ground contacting surfaces are subjected to bending deformations along tread circumferences. Therefore, it is particularly effective to apply the packing structural reinforcing layers above described to the folded layers positioned radially inwardly of the tire.

Moreover, with the belt constructions in Table 2, sums of the circumferential rigidities T of all the cord reinforcing layers or rigidities of entire belts were made substantially equal to each other. Therefore, the cords of pressure resistance of the respective tires were substantially equal.

In Examples 4–6 in the Table 2, the rigidity of the belts was changed by modifying the cord angles and the number of used cords. However, substantially the same effects can be obtained by changing the cord strength TABLE 2(a)

| | Comparative example 1 (indicated again) | | | Embodiment 4 | | | Comparative example 4 | | | Embodiment 5 | | |
|---|---|---|---|---|---|---|---|---|---|---|---|---|
| | Cord angle | Number of cords/cm | Circumferential rigidity T kg/cm | Cord angle | Number of cords/cm | Circumferential rigidity T kg/cm | Cord angle | Number of cords/cm | Circumferential rigidity T kg/cm | Cord angle | Number of cords/cm | Circumferential rigidity T kg/cm |
| 1B | right 20° | 7.2 | 279.7 | right 23° | 7.2 | 268.4 | right 16° | 7.2 | 292.7 | right 24° | 6.2 | 227.7 |
| 2B' | left 20° | 7.2 | 279.7 | left 20° | 7.2 | 279.7 | left 20° | 7.2 | 279.7 | left 20° | 7.2 | 279.7 |
| 3B' | right 20° | 7.2 | 279.7 | right 20° | 7.2 | 279.7 | right 20° | 7.2 | 279.7 | right 20° | 7.2 | |
| 4B'' | left 20° | 7.2 | 279.7 | left 16° | 7.2 | 292.7 | left 23° | 7.2 | 268.4 | left 18° | 7.2 | 286.5 |
| 5B | right 20° | 7.2 | 279.7 | right 20° | 7.2 | 279.7 | right 20° | 7.2 | 279.7 | right 20° | 7.2 | 279.7 |
| 6B' | left 20° | 7.2 | 279.7 | left 20° | 7.2 | 279.7 | left 20° | 7.2 | 279.7 | left 18° | 7.2 | 286.5 |
| 7B' | right 20° | 7.2 | 279.7 | right 20° | 7.2 | 279.7 | right 20° | 7.2 | 279.7 | right 18° | 7.2 | 286.5 |
| 8B'' | left 20° | 7.2 | 279.7 | left 20° | 7.2 | 279.7 | left 20° | 7.2 | 279.7 | left 18° | 7.2 | 286.5 |
| 9B' | right 20° | 7.2 | 279.7 | right 20° | 7.2 | 279.7 | right 20° | 7.2 | 279.7 | right 16° | 7.2 | 292.7 |
| 10B' | left 20° | 7.2 | 279.7 | left 20° | 7.2 | 279.7 | left 20° | 7.2 | 279.7 | left 16° | 7.2 | 292.7 |
| Sum of T kg/cm | 2797 | | | 2799 | | | 2799 | | | 2798 | | |
| Grade of belt (index number) | 100 | | | 130 | | | 59 | | | 162 | | |

| Belt cord | Belt cord marked by * |
|---|---|
| Material: nylon 66 | Material: nylon 66 |
| Kind: 1680 d/3 | Kind: 1260 d/3 |
| Strength: 44 kg/one | Strength: 33 kg/one |

TABLE 2(b)

| | Comparative example 5 | | | Comparative example 6 | | | Embodiment 6 | | | Embodiment 7 | | |
|---|---|---|---|---|---|---|---|---|---|---|---|---|
| | Cord angle | Number of cords/cm | Circumferential rigidity T kg/cm | Cord angle | Number of cords/cm | Circumferential rigidity T kg/cm | Cord angle | Number of cords/cm | Circumferential rigidity T kg/cm | Cord angle | Number of cords/cm | Circumferential rigidity T kg/cm |
| 1B | right 18° | 7.2 | 286.5 | right 18° | 7.2 | 286.5 | right 20° | 6.8 | 264.2 | right 20° | *9.2 | 268.1 |
| 2B' | left 20° | 7.2 | 279.7 | left 22° | 6.8 | 257.2 | left 20° | 7.2 | 279.7 | left 20° | 7.2 | 279.7 |
| 3B' | right 20° | 7.2 | 279.7 | right 22° | 6.8 | 257.2 | right 20° | 7.2 | 279.7 | right 20° | 7.2 | 279.7 |
| 4B'' | left 24° | 6.2 | 227.7 | left 20° | 7.2 | 279.7 | left 20° | 7.6 | 295.3 | left 20° | 7.6 | 295.3 |
| 5B | right 18° | 7.2 | 286.5 | right 18° | 7.2 | 286.5 | right 20° | 7.2 | 279.7 | right 20° | 7.2/ 279.7 | |
| 6B' | left 18° | 7.2 | 286.5 | left 20° | 7.2 | 279.7 | left 20° | 7.2 | 279.7 | left 20° | 7.2 | 279.7 |
| 7B' | right 18° | 7.2 | 286.5 | right 20° | 7.2 | 279.7 | right 20° | 7.2 | 279.7 | right 20° | 7.2 | 279.7 |
| 8B'' | left 20° | 7.2 | 279.7 | left 18° | 7.2 | 286.5 | left 20° | 7.2 | 279.7 | left 20° | 7.2 | 279.7 |
| 9B' | right 16° | 7.2 | 292.7 | right 16° | 7.2 | 292.7 | right 20° | 7.2 | 279.7 | right 20° | 7.2 | 279.7 |
| 10B' | left 16° | 7.2 | 292.7 | left 16° | 7.2 | 292.7 | left 20° | 7.2 | 279.7 | left 20° | 7.2 | 279.7 |
| Sum of T kg/cm | 2798 | | | 2798 | | | 2797 | | | 2801 | | |
| Grade of belt (index number) | 90 | | | 89 | | | 132 | | | 125 | | |

In the Examples 4–7, the circumferential rigidity of the cord reinforcing layers 4B'' was made higher than that of the cord reinforcing layers 1B. Such a selection of the circumferential rigidity of the cord reinforcing by modifying thicknesses of the cords that are used.

As can be seen from the above explanation, according to the invention by using at least one set of packing structural reinforcing layers in a tire the difference in rigidity at ends of a belt is effectively mitigated to improve durability of the tire and to ensure a sufficient pressure-resistance without increasing the number of cord reinforcing layers required as a whole.

It is further understood by those skilled in the art that the foregoing description is that of preferred embodiments of the disclosed tires and that various changes and modifications may be made in the invention without departing from the spirit and scope thereof.

What is claimed is:

1. A high inner pressure heavy duty pneumatic radial tire comprising; a carcass made of a plurality of plies by laminating organic fiber cord layers in a toroidal shape whose cords are arranged in parallel with each other and at cord angles within 70–90° relative to an equatorial plane of the tire, at least one of said plies having turn-up portions which are turned up about a pair of bead cores from inside to outside, and a belt made of exclusively organic fiber cords arranged as a plurality of cord reinforcing layers whose cords are arranged in parallel with each other and at cord angles within 10–70° relative to the equatorial plane, said cord reinforcing layers being laminated with the cords intersecting between the cord reinforcing layers, wherein said belt comprises at least two sets of packing structural reinforcing layers, each of said packing structural reinforcing layers comprising at least one cord reinforcing layer having width-wise edges folded inwardly to form folded layers and at least one further cord reinforcing layer having widths as cut corresponding to inner widths of the folded layers and surrounded by the folded layers to form an even number of inner core reinforcing layers, said inner core reinforcing layer of at least one set of packing structural reinforcing layers adjacent the carcass being higher in circumferential rigidity than the folded layers, and cords of said folded layers and said inner core reinforcing layers being made of materials substantially the same at least in modulus of elasticity.

2. A high inner pressure heavy duty pneumatic radial tire comprising; a carcass made of a plurality of plies by laminating organic fiber cord layers in a toroidal shape whose cord are arranged in parallel with each other and at cord angles within 70–90° relative to an equatorial plane of the tire, at least one of said plies having turn-up portions which are turned up about a pair of bead cores from inside to outside, and a belt made of exclusively organic fiber cords arranged as a plurality of cord reinforcing layers whose cords are arranged in parallel with each other and at cord angels within 10–70° relative to the equatorial plane, said cord reinforcing layers being laminated with the cords intersecting between the cord reinforcing layers, wherein said belt comprises at least two sets of packing structural reinforcing layers, each of said packing structural reinforcing layers comprising at least one cord reinforcing layer having width-wise edges folded inwardly to form folded layers, an intermediate layer made of at least one cord reinforcing layer is interposed between inner ends of the folded portions of at least one of said sets of packing structural reinforcing layers, and wherein said cord reinforcing layers of the intermediate reinforcing layers are higher in circumferential rigidity than the cord reinforcing layers of the folded layers, and cords of the intermediate reinforcing layers and the folded layers are made of materials substantially the same at least in modulus of elasticity.

3. A high inner pressure heavy duty pneumatic radial tire comprising a carcass made of a plurality of plies by laminating organic fiber cord layers in a toroidal shape whose cords are arranged in parallel with each other and at cord angles within 70–90° relative to an equatorial plane of the tire, at least one of said plies having turn-up portions which are turned up about a pair of bead cores from inside to outside, and a belt made of exclusively organic fiber cords arranged as a plurality of cord reinforcing layers whose cords are arranged in parallel with each other and at cord angles within 10–70° relative to the equatorial plane, said cord reinforcing layers being laminated with the cords intersecting between the cord reinforcing layers, wherein said belt comprises at least two sets of packing structural reinforcing layers, each of said packing structural reinforcing layers comprising at least one cord reinforcing layer having width-wise edges folded inwardly to form folded layers, an even number of inner core reinforcing layers having a width as cut corresponding to inner widths of the folded layers and surrounded by the folded layers, and an intermediate layer made of at least one cord reinforcing layer interposed between inner ends of the folded portions, wherein both said inner core and said intermediate reinforcing layers are higher in circumferential rigidity than the cord reinforcing layers of the folded layers, and cords of said folded layers and both said inner core and said intermediate reinforcing layers are made of materials substantially the same at least in modulus of elasticity.

4. A high inner pressure heavy duty pneumatic radial tire as set forth in claim 1 or 3, wherein said belt includes further a folded layer which do not have any inner core reinforcing layer on a radially outermost side.

5. A high inner pressure heavy duty pneumatic radial tire as set forth in claim 1 or 3, wherein said belt includes further two cord reinforcing layers on a radially outermost side.

6. A high inner pressure heavy duty pneumatic radial tires as set forth in claim 1 or 3, wherein the inner ends of said folded portions are spaced from the equatorial plane by substantially 35–75% of one half of a ground contacting width of a tread of the tire.

7. A high inner pressure heavy duty pneumatic radial tire as set forth in claim 1 or 3, wherein the inner ends of said folded portions are spaced from the equatorial plane by substantially 40–65% of one half of a ground contacting width of a tread of the tire.

8. A high inner pressure heavy duty pneumatic radial tire as set forth in claim 3, wherein a circumferential rigidity of said cord reinforcing layers of the inner core reinforcing layers is intermediate between those of said folded reinforcing layers and said intermediate reinforcing layers, and cords of the folded layers, said intermediate reinforcing layers and said inner core reinforcing layers are made of materials substantially the same at least in modulus of elasticity.

9. A relatively small type high inner pressure heavy duty pneumatic radial tire for an aircraft comprising; a carcass, a belt including one set of a packing layer adjacent said carcass having a folding layer with folded portions, said packing layer comprising at least one cord reinforcing layer having width edges folded inwardly to form folded layers, an even number of inner core reinforcing layers having a width as cut corresponding to inner widths of the folded layers and surrounded by the folded layers, an intermediate layer made of at least one cord reinforcing layer interposed between inner ends of the folded portions, said inner ends of the folded portions being located within a range of substantially 35-75% of one half of a ground contacting width of a tread of the tire from an equatorial plane of the tire, and a circumferential rigidity of said inner core reinforcing layers being intermediate the circumferential rigidity of said folded layers and the circumferential rigidity of said intermediate layer, and cords of the folded layers, the intermediate layers and the inner core reinforcing layers made of organic fiber cord materials substantially the same at least in modulus of elasticity.

10. A tire as set forth in claim 15, wherein lengths of the folded portions of said folded layers are different on both sides or substantially equal, and jointed points of the inner ends of the folded portions of the folded layers are arranged alternately with respect to the equatorial plane.

* * * * *